Dec. 18, 1962
G. H. HART
3,069,523
THERMOSTAT SWITCH
Filed Oct. 31, 1957
3 Sheets-Sheet 1
FIG. 1
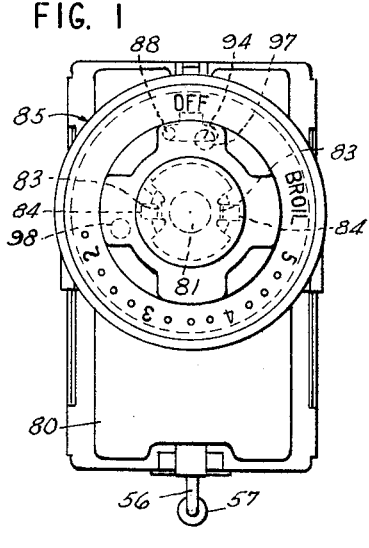
FIG. 2
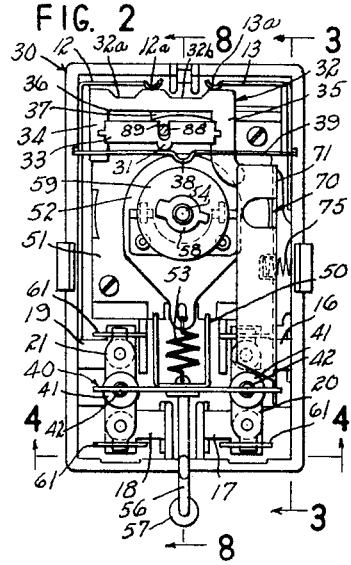
FIG. 3
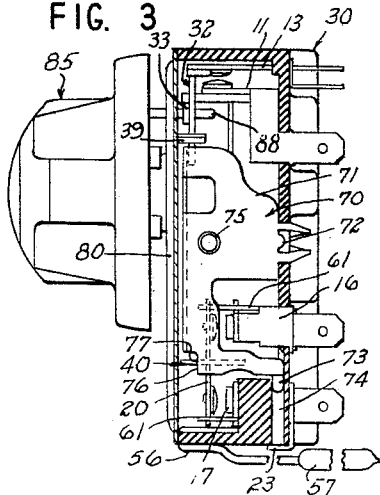
FIG. 4
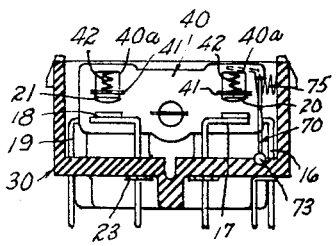
FIG. 6
FIG. 5
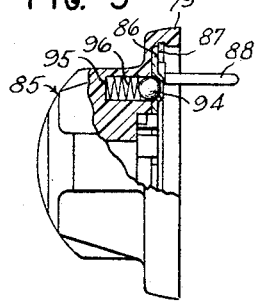
INVENTOR.
GEORGE H. HART
BY
Lindsey and Prutzman
ATTORNEYS Dec. 18, 1962  G. H. HART  3,069,523
THERMOSTAT SWITCH
Filed Oct. 31, 1957  3 Sheets-Sheet 2
FIG. 7
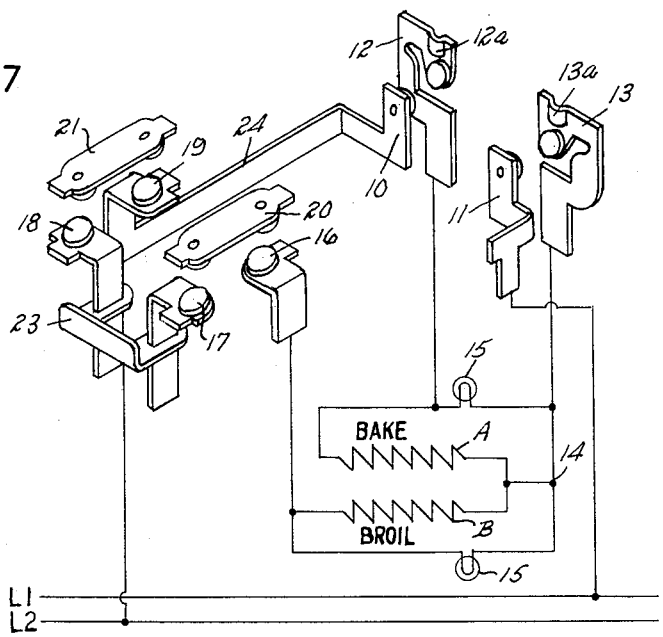
FIG. 8
FIG. 9
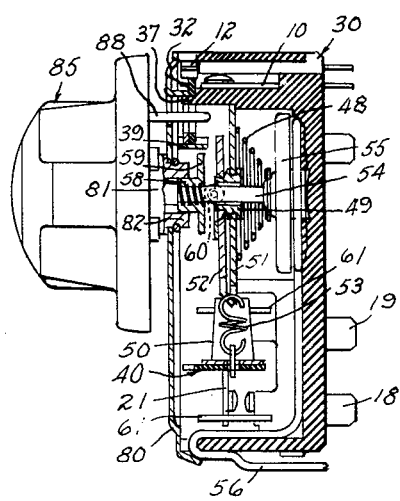
INVENTOR.
GEORGE H. HART
BY
Lindsey and Pritzman
ATTORNEYS Dec. 18, 1962  G. H. HART  3,069,523
THERMOSTAT SWITCH
Filed Oct. 31, 1957  3 Sheets-Sheet 3

INVENTOR.
GEORGE H. HART
BY
Lindsey and Prutzman
ATTORNEYS

United States Patent Office 3,069,523
Patented Dec. 18, 1962

3,069,523
THERMOSTAT SWITCH
George H. Hart, West Hartford, Conn., assignor to The Hart Manufacturing Company, Hartford, Conn., a corporation of Connecticut
Filed Oct. 31, 1957, Ser. No. 693,764
15 Claims. (Cl. 219—20)

The present invention relates to a temperature regulating device for range oven, industrial and air conditioning applications of the type utilizing two electric heating elements. The device includes a single control for selective use of either or both heating elements and for setting the thermostat control at a selected temperature.

For convenience, the invention will be described more particularly in connection with a range oven application where there is a broil element in one portion of the oven for broiling purposes and there is a separate bake element in another portion of the oven for use during baking. It is desirable in such installations to be able to turn on each heating element individually depending upon the cooking operation to be performed. It also is desirable to provide thermostat means for cycling the bake element to provide a substantially constant selected baking temperature. A third desideratum is to be able to use both elements at the same time for rapidly preheating the oven prior to a baking operation.

The aim of the present invention is to provide a switch incorporating all the desirable features above mentioned in a single compact mechanism of rugged and durable construction and wherein the setting of the switch is accomplished with a single control knob. A further aim is to provide a switch of the type referred to wherein the control can be set in a simple operation for both a preheating operation and a selected baking temperature and which will automatically change from preheat to thermostatically controlled bake when the oven reaches the selected baking temperature.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings:

FIG. 1 is a front view of the completely assembled control;

FIG. 2 is a front view with the control knob and front cover removed;

FIG. 3 is a cross-sectional view taken along the line 3—3 of FIG. 2;

FIG. 4 is a cross-sectional view taken along the line 4—4 of FIG. 2;

FIG. 5 is a side view of the control knob partially in cross-section;

FIG. 6 is a rear view of the control knob;

FIG. 7 is a diagrammatic view showing the contacts of the control and the associated electrical circuit;

FIG. 8 is a cross-sectional view taken along the line 8—8 of FIG. 2;

FIG. 9 is an enlarged fragmentary front view partly in cross-section showing the rocker plate assembly of FIG. 2;

Figure 10:
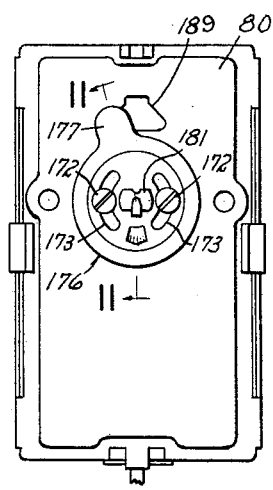
FIG. 10 is a front view of the control showing a modified actuating assembly and with the knob removed.

The detailed description of the control will be best understood by first referring to FIG. 7 wherein is shown the electrical components of the control and the circuit connections. The fixed contacts 10 and 11 and associated movable contacts 12 and 13 are hereinafter referred to as the auxiliary contacts and are under direct manual control. The fixed contact 11 is connected to one side of the line ($L_1$) while movable contact 13 is connected to common terminal 14 of the bake element A and the broil element B. The other end of the bake element A is connected to movable contact 12 and the other end of broil element B is connected to a fixed contact 16. The lamps 15 are conventional indicators for showing when the elements are energized.

The four fixed contacts 16, 17, 18 and 19 and the movable bridging contacts 20 and 21 are hereinafter referred to collectively as the main contacts. The bridging contacts 20, 21 are controlled by a thermostat and the bridging contact 20, in addition, is controlled by a latch 70, all as will be fully explained hereinafter. The fixed contacts 17 and 18 are coupled together by a shunt 23 and connected to the other side of the line ($L_2$). The fixed contact 19 is connected to contact 10 by the bar 24.

In the "off" position of the control, the movable contacts are in the position shown in FIG. 7 so that neither heating element is energized. When the control is turned from "off" to "bake," both movable contacts 12, 13 are moved to the closed position, movable contact 20 remains latched in open position, and movable contact 21 under control of the thermostat energizes the circuit to the bake element. In the broil position of the control, the movable contact 13 remains in closed position but movable contact 12 is returned to open position to de-energize the bake element circuit and contact 20 is unlatched so that it is closed by the thermostat for energizing the broil unit.

Referring now to the details of the control as shown in the remaining figures of the drawing, the control is mounted in a rectangular plastic housing 30 suitably configured to support the fixed contacts with the spade terminals thereof as well as the space terminals of movable contacts 12, 13 extending through registering apertures in the base for external connection. The movable contacts 12, 13 are controlled by a cam slide 32 of non-conductive material having notches 32a and 32b of unequal length. In the left hand position, as shown in FIG. 2, the struck-up portions 12a and 13a of the contacts 12, 13 respectively, are both engaged on the promontories of the cam slide 32 and thus both are cammed to the open or off position. When the cam slide 32 is moved to the central position, the struck-up portions 12a and 13a are accommodated in the notches 32a and 32b respectively, thus permitting both of the normally closed contacts 12 and 13 to move to closed position. When the cam slide 32 is moved to the extreme right position, the struck-up portion 13a is still accommodated in the wide notch 32b allowing this contact 13 to remain closed, but the struck-up portion 12a is no longer accommodated by short notch 32a and thus is moved by the left hand promontory of the slide to open position.

The cam slide 32 is generally U-shaped in configuration and has a wear plate 33 secured across the legs 34, 35 thereof forming a slot 36 therebetween to accommodate a projection 37 on the base of the housing which acts as a bearing for guiding the cam slide in its sliding movement. The wear plate 33 has a nose 31 which bears against a relatively strong leaf spring 39 extending from opposite sides of the housing. A central transverse groove 38 in the leaf spring accommodates the nose 31 when the slide is in the central position and resists movement of the slide from the central position to either side position. The leaf spring 39 is longitudinally slotted to accommodate the legs 34, 35.

Turning now to the main contacts, it will be noted that the movable bridging contacts 20, 21 are supported by a bridge 40 in the form of a non-conducting plate. The bridging contacts 20, 21 extend through apertures 40a in the bridge and are held in place by discs 41 secured thereto which are notched to engage the sides of the apertures 40a. The bridging contacts 20, 21 are thus permitted a limiting tilting or floating movement for equalizing the contact pressures when the contacts are moved to closed position. Springs 42 serve as balancing springs tending to hold the contacts 20, 21 at right angles to the bridge 40.

The bridge 40 is secured to the bight of a U-shaped bracket 50 whose legs pivotally engage the edge of a plate 51 secured to the housing 30. The connection between the bridge 40 and bracket 50 is such that a slight amount of swiveling of the bridge is permitted. The bracket 50 and hence the bridge 40 and contacts 20, 21 are actuated by a rocker plate 52 to which the bracket 50 is secured by a spring 53. The rocker plate 52 is pivotally mounted on a stud 49 which is supported by the plate 51 and through which extends the actuating post 54 of a hydraulic type thermostat comprising the diaphragm 55 spring pressed downwardly by spring 48, capillary tube 56 and bulb 57. The stud 49 is formed with a frusto-conical neck portion forming a bearing seat for the beveled aperture 52a of the rocker plate 52. The beveled aperture 52a is formed by a simple countersinking operation so that the usual grinding operations required to form a fulcrum are eliminated. In addition, this method of forming the pivot permits the rocker plate to tilt or rock in any direction so that there is no binding and close manufacturing tolerances are not required. Since the aperture 52a is considerably larger than the stud 49, assembly of the mechanism is rendered exceedingly simple. Secured to the rocker plate 52 such as by eyelets 61 is a saddle 62 which supports a pair of freely rotatable rollers 60 on opposite sides of the post 54. The post 54 is threaded at its upper end to adjustably receive a threaded sleeve 58 to which is secured a bearing disc 59. The bearing disc is adapted to engage the rollers 60 on the rocker plate. Inasmuch as the construction and mounting of the rocker plate 52 in accordance with the invention places the pivot of the plate very close to the rollers 60, any slight movement of bearing discs 59 results in a greatly multiplied movement of the free end of the rocker arm even though the rocker arm is of relatively small length. The use of the rollers 60 which receive the thrust of disc 59 against the rocker plate 52 provides a rolling contact which minimizes friction and prevents binding.

The pivoted bracket 50, rocker plate 52 and spring 53 form a toggle which normally holds the bridge 40 and contacts 20, 21 in the up or open position. This movement is limited by the stops 61 which engage the ends of the bridging contacts 20, 21 to limit the gap. When the bearing disc 59 bears against the rollers 60 to depress the raised end of the rocker plate 52, the connected end of the spring 53 is brought below the pivot of bracket 50 causing the bridge 40 and contacts 20, 21 to move to closed position. In the operation of the control, the bearing disc 59 moves with the post 54 of the thermostat and the temperature at which the disc will actuate or release the rocker plate 52 is set by the position of threaded sleeve 58 on the post 54.

An important feature of the invention is the latch 70 which comprises a flanged plate 71 which is positioned for transverse tilting movement by a center prong 72 extending through an aperture in the base of the housing and an extension 73 received in the recess 74. The latch is biased inwardly to the left as viewed in FIG. 2 by a spring 75. The latch 70 has a shoulder 76 arranged to engage beneath the shoulder 77 of the bridge 40 for latching that end of the bridge 40 in position such that the bridging contact 20 is held out of contact with the fixed contacts 16, 17. It will be noted that the latch plate 71 is of sufficient length so that it extends into the path of movement of the leg 35 of the slide 32. The arrangement is such that when the slide 32 is moved to the extreme right position, as viewed in FIG. 2, the latch 70 is moved to and held in unlatched position. In all other positions of the slide 32, the latch is free to move into latching engagement with bridge 40 under the influence of spring 75.

Turning now to the single control for operating the slide 32 and setting the thermostat, a first embodiment is best shown in FIGS. 1, 3, 5, 6, and 8. The cover plate 80 has a spindle 81 journaled therein provided at its inner end with a coupling 82 which drivingly engages with the adjustable threaded sleeve 58 of the thermostat unit. The outer end of spindle 81 is provided with spring fingers 83 which engage in sockets 84 in the hub of the single control knob and selector dial 85. Thus, turning of the knob 85 directly sets or selects the temperature at which the thermostat unit will function.

Slidably mounted in the skirt 79 of the knob 85 so that it can swivel relative thereto, is a control actuating disc 86 which is retained in assembled position by the snap ring 87. The control actuating disc carries an actuating pin 88 which extends through a slot in the cover and engages in a notch 89 formed in the slide 32 for actuating the same.

The control actuating disc 86 has both a positive and a yielding driving connection with the knob 85 depending on the relatively rotated positions thereof and the direction of movement. The positive driving connection is provided by inturned lips 90, 91 on the disc which will abut the shoulders 92, 93 integrally formed at the interior of the knob. The yielding driving connection is provided by a ball detent 94 carried in the bore 95 and biased outwardly by a spring 96 so that it will engage in either of the two apertures 97, 98. The apertures are located so that the aperture 97 will receive the ball detent 94 when the lip 90 is against shoulder 92 and aperture 98 will receive the ball detent when the lip 91 is against shoulder 93.

The operation of the single control will be apparent from the foregoing description taken in connection with the following explanation. In the initial off position of the control mechanism, the slide 32 is in the left hand position shown in FIG. 2 and the knob assembly is in the position shown in FIGS. 1 and 6. As the knob 85 is turned in a clockwise direction, as viewed in FIG. 1, the engagement of ball detent 94 in aperture 97 provides sufficient driving force to move the disc 86 and its pin 88 therewith so as to shift the slide to the center position and conditions the oven for a baking operation. In the center position of the slide, the nose 31 of the wear plate attached to the slide engages in the groove 38 of the leaf spring 39, thus exerting a considerable holding force to retain the slide in the center position. This holding force is greater than the driving force exerted by the ball detent 94 so that upon continued turning of the knob 85, the ball detent is cammed out of the aperture 97 permitting the disc 86 and its pin 88 to remain stationary while the knob is rotated to select the desired temperature setting of the thermostat. As soon as this setting exceeds the temperature of the oven, the rocker plate 52 is actuated to close the contact 21. Contact 20 remains open, however, due to the latch 70 and thus the broil element is prevented from being energized. Relative movement of the knob 85 and disc 86 continues until the knob has been turned sufficiently to bring the shoulder 93 into engagement with the lip to provide a positive drive connection which is sufficient to overcome the resistance to movement of the slide and thus permits the slide to be moved to the broil position by the final turning of the knob. During reverse turning of the knob 85, a reverse movement of the parts takes place. The slide is first moved to center position whereupon the knob 85 moves independently of the pin and disc until the shoulder 92 engages lip 90 whereupon the slide is moved to the final off position. The difference in force which has to be applied to the knob 85 in changing from one heating condition to another gives the operator a clear indication when the switching occurs.

An important advantage of the control as just described is that in the event it is desired to use both heating elements for rapid preheating prior to a baking operation, this can be accomplished automatically merely by turning the knob 85 to the broil position and then backing it off to the baking position and the desired baking temperature. As previously explained, the leg 35 of the slide 32 engages the latch 70 and moves it to unlatched position when the slide is moved to the extreme right hand or broil position. As will be realized, the thermostat assembly is adjusted at this point for maximum heat, and therefore, if this is done when the oven is below maximum temperature, the movable bridging contacts 20, 21 are necessarily moved into engagement with the stationary contacts 16, 17 and 18, 19 respectively. Following this operation, if the knob 85 and hence the slide 32 are backed off to baking position, the bridging contact 20 will remain in closed position because the shoulder 77 of bridge 40 is below shoulder 76 of the latch and thus cannot be engaged when the latch is released. Thus, by reference to FIG. 7, it will be seen that the control has been placed in condition for energizing both heating elements to accomplish a rapid preheat. When the oven reaches the selected temperature for which the thermostat has been adjusted, the thermostat raises the bridge 40 and thus both bridging contacts 20, 21 to open position. Immediately upon this happening, the latch 70 under the influence of spring 75 moves into latching engagement with the right hand end of bridge 40 and thereafter prevents closing of the bridging contact 20 and consequent cycling of the broil element. The latch 70, though it prevents closing of the bridging contact 20, does not prevent closing of bridging contact 21 due to the swivel connection between the bridge 40 and the U-shaped bracket 50. Accordingly, the thermostat assembly will now only control the bridging contact 21 which cycles only the bake element in the desired manner for a baking operation.

Figure 11:
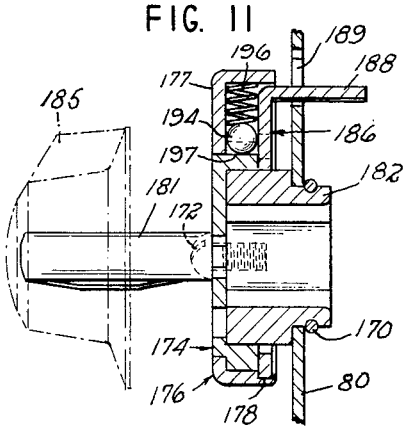
FIG. 11 is a fragmentary cross-sectional view taken along the line 11—11 of FIG. 10.

In the embodiment of the single control shown in FIGS. 10–13 of the drawings, the coupling 182 journaled in the cover plate 80 and retained in assembled position by the spring clip 170 has attached thereto by screws 172, a cup-shaped control member 174 having an outwardly extending spindle 181 on which may be mounted any suitable turning knob 185 which may be of a conventional type as shown in phantom in FIG. 11. The slots 173 through which screws 172 extend permit adjustment of the member 174 relative to the coupling 182. As in the first embodiment, turning of the knob 185 directly sets or selects the temperature at which the thermostat unit will function.

Figure 12:
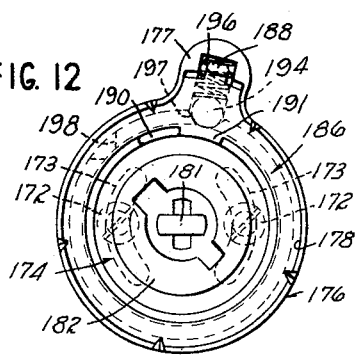
FIG. 12 is a rear view of the assembly shown in FIG. 11.
Figure 13:
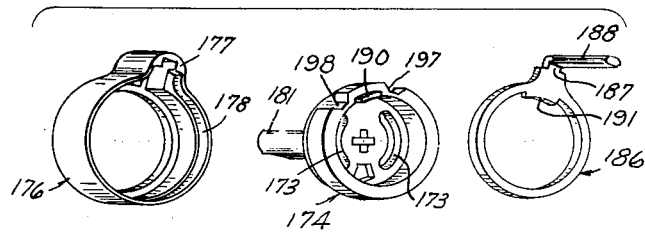
FIG. 13 is an exploded perspective view of the main elements of the assembly shown in FIG. 11.

Swivelly mounted on the actuating member 174 is a control actuating member comprising a cup 176 formed with an annular recess 178 at its inner edge in which is mounted a ring 186 formed with an integral actuating pin 188 which extends through the slot 189 in the cover and engages in the notch 89 of the slide 32 for actuating the same. The ring 186 is prevented from turning relative to cup 176 by reason of the neck portion 187 which fits within the pocket formed in the protuberance 177 and it is staked in assembled position as shown in FIG. 12. The control member 174 has both a positive and a yielding driving connection with the cup 176 and ring 186 depending upon the relatively rotated positions thereof and the direction of movement. The positive driving connection is provided by a tab 190 on the control member 174 which will engage against either side of the lip 191 formed on the inner periphery of the ring 186. The yielding driving connection is provided by a ball detent 194 disposed in the pocket of protuberance 177 and biased inwardly by spring 196 so that it will engage in either of the two notches 197, 198 formed in the periphery of the control member 174. The notches 197, 198 are located on either side of the tab 190 so that the notch 197 will receive the ball detent when the tab 190 is engaged against the left side of lip 191 as viewed in FIG. 13, and notch 198 will receive the ball detent when tab 190 is engaged against the right side of lip 191.

The operation of this embodiment of the single control is essentially the same as that of the first embodiment which is to say that when the knob is turned from off to bake, the first movement is to move the slide to its intermediate position and the final movement is to move the slide to the broil position. Upon reverse movement of the knob, the reverse sequence takes place. The operation of the thermostat and the latch 70 is the same in both cases.

It thus will be seen that a very compact and efficient single control has been provided for attaining all of the desired operating conditions of a range oven or other type of installation including a preheat condition using both heating elements which automatically reverts to a desired thermostat controlled single heating element type of operation at the completion of preheating.

Inasmuch as the embodiments of the invention may be subject to variation and modification by one skilled in the art without departing from the invention, all such variations and modifications are intended to be included within the scope of the invention.

I claim:

1. A control device for use in a heating system of the type having two electric heating elements comprising a pair of contacts, a common movable support for said contacts, an adjustable thermostat assembly connected to the support for moving the same in switch opening and closing directions, and a latch movable into position for preventing closing movement of one of the contacts, said support being tiltable to permit closing movement of the other contact.

2. A control device for use in a heating system of the type having two electric heating elements comprising a set of auxiliary switch contacts manually settable in positions for energizing either or both of the heating elements, an adjustable thermostat assembly, a set of main contacts connectable in series with the auxiliary switch contacts and actuated by the thermostat assembly for opening and closing circuits to the two heating elements responsive to temperature, a latch movable into position by the setting of said auxiliary switch contacts for preventing closing movement of one of the main contacts to prevent cycling of one of the heating elements, and means biasing the latch into latching position.

3. A control device for use in a heating system of the type having two electric heating elements comprising a set of auxiliary switch contacts manually settable in positions for energizing either or both of the heating elements, an adjustable thermostat assembly, a set of main contacts connectable in series with the auxiliary switch contacts and actuated by the thermostat assembly for opening and closing circuits to the two heating elements responsive to temperature, a latch movable into position for preventing closing movement of one of the main contacts to prevent cycling of one of the heating elements, means biasing the latch into latching position, and manually operable means for setting said set of auxiliary switch contacts and to render the latch inoperable.

4. A control device for use in a heating system of the type having two electric heating elements comprising a set of auxiliary switch contacts settable in positions for energizing either or both of the heating elements, an adjustable thermostat assembly, a set of main contacts connectable in series with the main switch contacts and actuated by the thermostat assembly for opening and closing circuits to the two heating elements responsive to temperature, a latch biased into position for preventing closing movement of one of the main contacts to prevent cycling of one of the heating elements, and single control means for performing the following operations in sequence: moving both of the auxiliary switch contacts to closed position, adjusting the thermostat assembly for maximum heat, and simultaneously moving one of the auxiliary switch contacts to open position and moving the latch to unlatching position.

5. A control device for use in a heating system of the type having two electric heating elements comprising an auxiliary switch having a pair of movable contacts, a manually operable actuator for the contacts movable into a first position where both contacts are open, a second position where both contacts are closed, and a third position where one contact is open and one contact is closed, an adjustable thermostat assembly, a main switch having a pair of movable contacts controlled by the thermostat assembly, a latch for latching one of the movable contacts of the main switch in open position, means biasing the latch into latching position, and means on the manually operable actuator for moving the latch to unlatching position when the actuator is in said third position.

6. A control device for use in a heating system of the type having two electric heating elements comprising an auxiliary switch having a pair of movable contacts, a slide cam engageable with the movable contacts and movable between a first position in which both contacts are open, a second position in which both contacts are closed, and a third position in which one contact is open and one contact is closed, an adjustable thermostat assembly, a main switch having a pair of movable contacts controlled by the thermostat assembly, a latch biased into latching position for preventing one of the movable contacts of the main switch from moving to closed position, and means on the slide for moving the latch to unlatching position when the slide is moved to said third position.

7. A control device for use in a heating system of the type having two electric heating elements comprising an auxiliary switch having a pair of movable contacts, a movable cam for controlling the movable contacts having a first position in which both contacts are open, a second position in which both contacts are closed, and a third position in which one contact is open and one contact is closed, a thermostat assembly having a rotatable setting member, a main switch having a pair of movable contacts controlled by the thermostat assembly, manually operable means for moving the setting member through a range of adjustments, and actuating means for the cam having a releasable connection with said manually operable means for positioning the cam in said first and third positions during initial and final movement of the setting member in either direction.

8. A control device for use in a heating system of the type having two electric heating elements comprising an auxiliary switch having a pair of movable contacts, a movable cam engageable with the movable contacts having a first position in which both contacts are open, a second position in which both contacts are closed, and a third position in which one contact is open and one contact is closed, yieldable holding means for holding the cam in said second position, a thermostat assembly having a rotatable setting member, a main switch having a pair of movable contacts controlled by the thermostat assembly, a latch biased into position for preventing closing of one of the movable contacts of the main switch and being cammed to unlatching position by the movable cam when the latter is in said third position, a manually operable control knob connected to the setting member of the thermostat assembly, an actuating member mounted on the knob and engaging the cam, said actuating member being mounted for limited movement relative to the knob and having a yielding driving connection thereto whereby during initial turning movement of the control knob in one direction the cam is moved from first to second position, during final turning movement in said direction the cam is moved from second to third position, during initial return movement the cam is moved from third to second position, and during final return movement the cam is moved from second to first position.

9. A control device for use in a heating system of the type having two electric heating elements comprising a casing, an auxiliary switch in the casing having a pair of movable contacts, a slide cam slidably mounted in the casing and engageable with the movable contacts, said cam being slidable sequentially from a first position in which both contacts are open to a second position in which both contacts are closed, and thence to a third position in which one contact is open and one contact is closed, yieldable holding means for holding the cam in said second position, a thermostat assembly having a rotatable setting member, a main switch having a pair of movable contacts controlled by the thermostat assembly, a movable latch plate having a shoulder for preventing closing movement of one of the movable contacts of the main switch, means biasing the latch plate into latching position, means on the cam for moving the latch plate to unlatching position when the cam is in said third position, a manually operable control knob connected to the rotatable setting member of the thermostat assembly, a disc rotatably mounted on the control knob and having an actuating element connected to the slide cam, means forming a yieldable driving connection between the knob and the disc having less force than said yieldable holding means, and means for limiting turning movement of the knob relative to the disc.

10. A control mechanism for electric switches and the like comprising a manually operable knob adapted to turn a spindle, a disc mounted on the knob for turning movement relative to the knob, an actuating element carried by the disc, means forming a yieldable driving connection between the knob and disc, stop means for limiting turning movement of the knob relative to the disc, said stop means comprising engaging shoulders on the knob and disc.

11. A control mechanism as defined in claim 10 wherein the yieldable driving connection is provided by a detent engageable between the knob and disc when said shoulders are engaged.

12. A control mechanism for electric switches and the like comprising a spindle for receiving a manually operable knob, a control member fixed to the spindle for movement therewith, an actuating member mounted on the control member for rotation relative thereto, interengaging shoulders on the control member and actuating member to limit relative movement thereof, and a yieldable driving connection between the control member and actuating member.

13. In a temperature control switch assembly, a toggle including a rocker arm having an aperture therein, a fixed stud extending through the aperture and forming a bearing for the rocker arm, rollers on opposite sides of the aperture, and a thermostat having an actuating member engaging the rollers.

14. In a temperature control switch assembly, a rocker arm having an aperture formed with a beveled edge, a supporting member extending through the aperture and having a surface engaged by a portion of the edge of the aperture to form a fulcrum therefor, a thermostat having a movable actuating member and means for engaging the actuating member with the rocker arm on opposite sides of the supporting member and said fulcrum.

15. A control device for use in a heating system of the type having two heating elements comprising a main switch having fixed and movable contacts for the heating elements, a rocker arm fulcrumed for pivotal movement relative to the fixed contacts, an adjustable thermostat assembly operative to pivot said rocker arm, a yieldable driving connection between the rocker arm and the movable contacts, and a latch movable into a position preventing movement of one of the movable contacts.

(References on following page)

References Cited in the file of this patent

UNITED STATES PATENTS

| | | | |
|---|---|---|---|
| 2,385,433 | Weber | Sept. 25, | 1945 |
| 2,388,702 | Pearce | Nov. 13, | 1945 |
| 2,419,083 | Myers | Apr. 15, | 1947 |
| 2,486,873 | Pearce | Nov. 1, | 1949 |
| 2,541,314 | Weber et al. | Feb. 13, | 1951 |
| 2,630,499 | Weld | Mar. 3, | 1953 |
| 2,639,352 | Watson | May 19, | 1953 |
| 2,648,741 | Starbird | Aug. 11, | 1953 |
| 2,747,073 | Welch et al. | May 22, | 1956 |
| 2,785,257 | Smith | Mar. 12, | 1957 |
| 2,811,615 | Stowell | Oct. 29, | 1957 |
| 2,815,428 | Pearce | Dec. 3, | 1957 |
| 2,866,863 | Simpson | Dec. 30, | 1958 |